United States Patent [19]
Mroczkowski

[11] Patent Number: 5,162,409
[45] Date of Patent: Nov. 10, 1992

[54] TIRE TREAD RUBBER COMPOSITION

[75] Inventor: Tomasz S. Mroczkowski, Madison, Conn.

[73] Assignee: Pirelli Armstrong Tire Corporation, New Haven, Conn.

[21] Appl. No.: 739,701

[22] Filed: Aug. 2, 1991

[51] Int. Cl.$^5$ ............................................. C08K 5/54
[52] U.S. Cl. ................................. 524/262; 152/564; 525/235; 524/492; 524/493; 524/495; 524/496
[58] Field of Search ............... 524/492, 493, 495, 496, 524/262; 152/564; 526/293, 294, 295; 525/235

[56] References Cited

U.S. PATENT DOCUMENTS

| | | | |
|---|---|---|---|
| 2,891,595 | 6/1959 | Kuntz et al. | 152/564 |
| 3,873,489 | 3/1975 | Thurn et al. | 524/262 |
| 4,074,035 | 2/1978 | Powers et al. | |
| 4,229,333 | 10/1980 | Wolff et al. | 524/571 |
| 4,468,496 | 8/1984 | Takeuchi et al. | 525/235 |
| 4,517,335 | 5/1985 | Wolff et al. | 524/493 |
| 4,824,900 | 4/1989 | Sakurai | |

OTHER PUBLICATIONS

Bhakuni, et al., Encyclopedia of Polymer Science and Engineering, 2nd ed., vol. 16, John Wiley, 1989, p. 861.
Eirich, F., Science and Technology of Rubber, Academic Press, New York, 1978, pp. 374, 375.
Heinisch, K. F., Dictionary of Rubber, J. Wiley & Sons, 1974, pp. 64 to 65.
Hofmann, Rubber Technology Handbook, Hanser Publishers, Munich, 1989, pp. 92–93.

*Primary Examiner*—Veronica P. Hoke
*Attorney, Agent, or Firm*—St. Onge Steward Johnston & Reens

[57] ABSTRACT

An abrasion-resistant halogenated isobutylene-based rubber composition having good traction characteristics is disclosed. In a preferred embodiment, the composition comprises a halogenated isobutylene rubber, styrene/butadiene rubber and polybutadiene rubber combined with carbon black and a silane-coupled silica filler. In automobile tire treads, tire retreads, and other anti-skid materials, the composition exhibits viscoelastic properties offering excellent traction and good rolling resistance with no loss in tire treadwear.

23 Claims, 4 Drawing Sheets

TIRE TREAD RUBBER COMPOSITION

BACKGROUND OF THE INVENTION

This invention relates to an abrasion-resistant tire tread rubber composition comprising halogenated isobutylene rubber.

Butyl rubbers are copolymers of isobutylene with a conjugated diene, usually isoprene, which provides double bonds allowing the rubber to be vulcanized with sulphur and other vulcanizing agents. On adding a halogen such as chlorine or bromine to butyl rubber in an inert solvent like hexane, a rapid electrophilic substitution reaction occurs, whereby one halogen atom is added per isoprene unit, mainly in the allylic position. The addition of a second halogen atom proceeds at a much slower rate, and the addition of halogen atoms to the double bonds occurs hardly at all. Thus, only a relatively small number of halogen atoms are built into the polymer chain, and a typical brominated butyl rubber comprises 1 to 3.5% bromine.

Though the properties of butyl rubber and halogenated butyl rubber are similar, the halogen atom and the allylic halogen structure in halogenated butyl rubber results in an enhanced cure reactivity. Vulcanization rates are faster with halogenated butyl rubber and require lower amounts of curatives, and, for the same cure system, higher states of cure are possible. Bromobutyl rubber compounds also give better adhesion to other rubbers. Because of these properties, bromobutyl rubber vulcanizates have lower gas permeability, better weather and ozone resistance, higher hysteresis, and better chemical and heat resistance than their butyl rubber counterparts. Bromobutyl rubbers have been employed in innerliners of tubeless tires, innertubes for demanding applications, tire components, linings, belts, hoses and the like. (For a brief summary of production, properties and uses of bromobutyl and chlorobutyl, see Hofmann, *Rubber Technology Handbook*, Oxford University Press, 1989, pages 92 to 93, and Heinisch, K. F., *Dictionary of Rubber*, J. Wiley & Sons, 1974, pages 64 to 65.)

Though halogenated butyl rubbers also exhibit high damping characteristics, the rubbers have not been employed in pneumatic tire treads for traction enhancement because of poor tear and abrasion resistance. Desirable tire tread compositions are engineered to produce traction, speed, and stability, simultaneously providing frictional contact for the transmission of driving, braking and cornering forces as well as wear resistance. Typical tread rubber compositions employ elastomers having a relatively high tensile strength and high abrasion resistance.

For example, Studebaker and Beatty described three tread compositions: two had styrene/butadiene elastomers and one had natural rubber (Eirich, F. R., *Science and Technology of Rubber*, Academic Press, 1978, pages 374 to 375; compounds 188, 208 and 211 are treads). The example tire tread rubber of the Bhakuni, et al. review (*Encyclopedia of Polymer Science and Engineering*, 2nd ed., volume 16, John Wiley, 1989, page 861) contained styrene/butadiene and butadiene rubber. Takino, et al., disclosed a tire tread rubber composition comprising isoprene and styrene/butadiene in a ratio of 5/95 to 60/40 and 50 to 200 parts by weight carbon black, with the isoprene component containing more than 50% 3,4-vinyl and 1,2-vinyl bonds and the styrene/butadiene rubber having a glass transition temperature lower by 10° C. or more than the isoprene rubber (U.S. Pat. No. 4,824,900).

SUMMARY OF THE INVENTION

It is an object of this invention to provide a new tire tread rubber composition. It is another object of this invention to provide a tread composition that exhibits good anti-skid properties in all conditions—dry, wet, snow, and ice—and decreased rolling resistance without abnormal tire treadwear. It is another object of the invention to provide an abrasion-resistant halogenated isobutylene-based rubber composition having high damping characteristics and good abrasion resistance.

These and other objects are accomplished by the present invention, which describes a rubber composition suitable for use in automobile tire treads, tire retreads, and other antiskid materials. The rubber composition comprises a halogenated isobutylene rubber which can be the sole rubber of the composition or one of the rubbers therein. A preferred embodiment comprises a rubber component comprising 20 to 60 weight percent styrene/butadiene rubber, 20 to 60 weight percent butadiene rubber, and 10 to 30 weight percent of a halogenated rubber; a silica filler; and an organosilane cross-linking agent. A method for producing tire tread compositions according to this invention is also disclosed.

BRIEF DESCRIPTION OF THE FIGURES

FIG. 2 plots hysteresis loss (tan $\delta$) for compositions according to the invention (denoted compositions B, C, and D) as compared with a control (composition A). FIG. 3 plots dynamic modulus (G') and FIG. 4 plots loss modulus (G") for the same compositions.

DETAILED DESCRIPTION OF THE INVENTION

Figure 1:
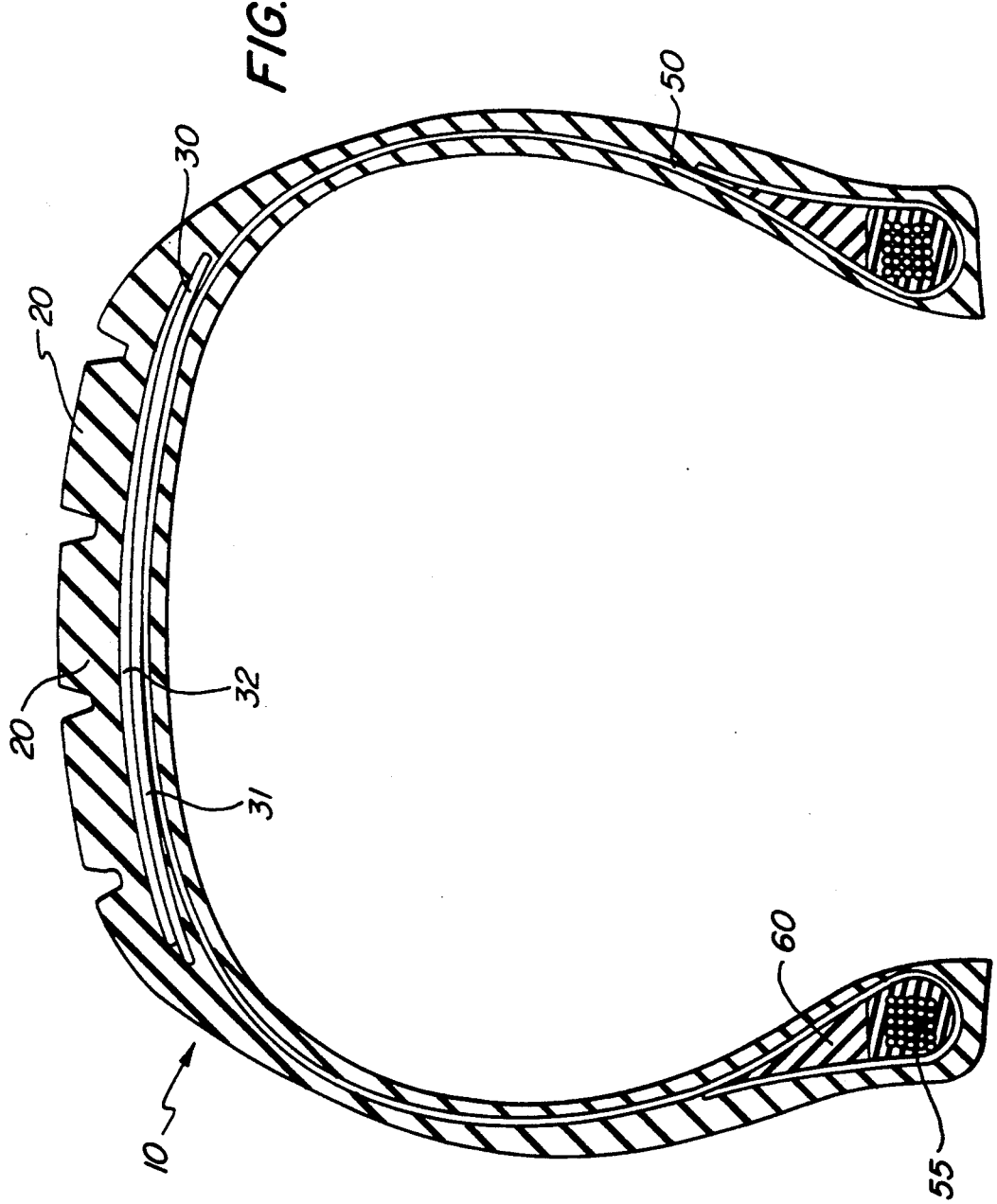
FIG. 1 is a schematic cross section of a tire employing the tire tread rubber composition of this invention in tread component 20.

In the practice of this invention, rubber compositions comprise a halogenated isobutylene rubber, silica, and an organosilane cross-linking agent. The halogenated isobutylene rubber can constitute the sole rubber component of the composition, but preferably is present along with other rubber components. In a preferred embodiment, halogenated isobutylene rubber, styrene/butadiene rubber and polybutadiene rubber comprise the rubber component in a tire tread composition employing carbon black and a silane-coupled silica filler. Preferred embodiments exhibit a superior dynamic response over a wide temperature range and satisfactory abrasion and tear resistance.

By the term "halogenated isobutylene rubber" is meant a halogenated polymer comprising isobutylene subunits. Halogens include chlorine and bromine; bromine is preferred. The halogenated rubbers of this invention include polymers bearing halogen atoms incorporated before or after polymerization.

The halogenated isobutylene rubbers of this invention include, but are not limited to, brominated butyl rubber (commonly called bromobutyl and abbreviated BIIR where isoprene is the diene copolymerized with isobutylene; as used herein, the term "butyl rubber"

means a copolymer of isobutylene and a diene such as isoprene); chlorinated butyl rubber (commonly called chlorobutyl and abbreviated CIIR where isoprene is the diene copolymerized with isobutylene); so-called star-branched polyisobutylene comprising branched or star-shaped polyisobutylene subunits, such as star-branched bromobutyl; isobutylene-bromomethylstyrene copolymers such as isobutylene/meta-bromomethylstyrene and isobutylene/para-bromomethylstyrene, isobutylene/chloromethylstyrene copolymers such as isobutylene/meta-chloromethylstyrene and isobutylene/para-chloromethylstyrene, and the like halomethylated aromatic interpolymers (disclosed in U.S. Pat. No. 4,074,035 to Powers and Kuntz); isoprene and halogenated isobutylene copolymers (chlorinated or brominated); polychloroprene; and the like, and mixtures thereof.

The halogenated isobutylene rubbers of this invention also include halogenated terpolymers comprising isobutylene such as halogenated isobutylene/styrene/dienes, e.g., isobutylene/ styrene/isoprene, and halogenated isobutylene/methylstyrene/ dienes, e.g., isobutylene/methylstyrene/isoprene; isobutylene/halomethylstyrene/diene terpolymers including isobutylene/bromomethylstyrene/isoprene; isobutylene/haloisobutylene/dienes, including isobutylene/bromobutylene/isoprene; and the like, and mixtures thereof with other halogenated isobutylene rubbers.

By the term "silica" is meant any type or particle size silica or another silicic acid derivative, or silicic acid, processed by solution, pyrogenic or the like methods and having any surface area, including untreated, precipitated silica, crystalline silica, colloidal silica, aluminum or calcium silicates, fumed silica, and the like. In a preferred embodiment, untreated, precipitated silica is employed.

By an "organosilane cross-linking agent" is meant any silane filler and/or cross linking activator and/or silane reinforcing agent known to those skilled in the art including, but not limited to, vinyl triethoxy silane, vinyl-tris-(beta-methoxyethoxy) silane, methacryloylpropyltrimethoxysilane, mercaptopropyltrimethoxysilane and the like, and mixtures thereof. In a preferred embodiment, bis-(3(triethoxysilyl)-propyl)-tetrasulfane is employed.

To make a tire tread rubber, halogenated isobutylene rubber is either used as the sole rubber component or mixed with natural rubber and/or synthetic rubber. By the term "natural rubber" is meant rubber obtained from natural sources, or its chemical equivalent, such as cis-1,4-polyisoprene. By the term "synthetic rubber" is meant any rubber produced synthetically such as polybutadiene, polyisoprene, styrene/butadiene co-polymers (hereinafter referred to as SBR), styrene/isoprene/butadiene terpolymers, butadiene/acrylonitrile copolymers, isoprene/acrylonitrile copolymers, ethylene/propylene/diene, butyl rubber, and the like. Mixtures of rubbers may also be employed.

Styrene/butadiene rubber and polybutadiene rubber are preferred. By the term "butadiene rubber", herein abbreviated BR, is meant polybutadiene rubber. By the term "styrene/butadiene rubber" is meant a copolymer of styrene and butadiene.

In one embodiment of the invention, tire tread rubber comprises 10 to 30 weight percent of a halogenated isobutylene rubber, 20 to 60 weight percent styrene/butadiene rubber, and 20 to 60 weight percent butadiene rubber. A preferred rubber comprises 30 to 50 weight percent styrene/butadiene rubber and 30 to 50 weight percent butadiene rubber with 10 to 30 weight percent halogenated isobutylene rubber. A most preferred rubber comprises 20 weight percent brominated isobutylene rubber, 40 weight percent styrene/butadiene rubber, and 40 weight percent butadiene rubber. As set out above, brominated isobutylene rubber includes but is not limited to bromobutyl, star-branched bromobutyl and isobutylene/bromomethylstyrene copolymers. Preferred styrene/butadiene rubbers have 10 to 50% bound styrene content. Preferred butadiene rubbers have 90% or greater cis content.

Tire tread rubber of this invention is blended with conventional tire ingredients and additives known to those skilled in the art such as effective amounts of processing aids, accelerators, cross-linking and curing materials, antioxidants, antiozonants, fillers and the like to make halogenated isobutylene-based tire tread rubber compositions. Processing aids include, but are not limited to, plasticizers, tackifiers, extenders, chemical conditioners, homogenizing agents and peptizers such as mercaptans, petroleum and vulcanized vegetable oils, resins, rosins, and the like. Accelerators include amines, guanidines, thioureas, thiazoles, thiurams, sulfenamides, thiocarbamates, xanthates, and the like. Cross-linking and curing agents include sulfur, zinc oxide, and fatty acids. Fillers include carbon black and mineral fillers such as silica and clay. Example formulations are set forth hereinafter.

A filler system of silane-coupled silica is employed in preferred rubber compositions of this invention. In a preferred embodiment, 10 to 30 parts per hundred rubber of untreated, precipitated silica is employed with an effective amount of an organosilane coupling agent, e.g., 1 to 8 parts per hundred rubber. A most preferred embodiment employs 20 parts per hundred rubber of untreated, precipitated silica with a corresponding silane level of 14 to 28 parts per hundred silica. Tread grade carbon black is also employed as a filler in preferred embodiments in amounts ranging from 40 to 70 parts per hundred rubber. A most preferred level is 55 parts per hundred rubber.

The materials are mixed by conventional means known to those skilled in the art, in a single step or in stages. For example, the rubber of this invention can be processed in one step. In a preferred embodiment, the silica and silane are added in a different stage from zinc oxide and other cure activators and accelerators. In a more preferred embodiment, antioxidants, antiozonants and processing materials are added in a stage after silica and silane have been processed with the rubber, and zinc oxide is added at a final stage to maximize compound modulus. Thus, a two to three (or more) stage processing sequence is preferred. Additional stages may involve incremental additions of filler and processing oils. Example processing stages are illustrated hereinafter.

In the practice of this invention, the tire tread composition so formed is employed in tire treads. As is known to those skilled in the art, in the conventional manufacture of a radial ply tire, the extruded tread compound is wrapped over the belt area in the final stages of tire assembly prior to curing. For further understanding of the position of these components, reference is made to the accompanying FIG. 1, which depicts a cross-sectional view of tire 10, which employs the rubber composition of this invention in tread component 20.

The tire of FIG. 1 consists of a carcass structure comprising one or more carcass plies 50, provided with textile cords disposed according to a radial extension, folded back from the inside to the outside around a metal bead core 55 disposed in the area of the tire bead, over which, at a radially external position, a filling strip 60 of elastomeric material of substantially triangular cross-sectional shape is placed in a manner known by those skilled in the art. Disposed crown-wise to the tire carcass, in the usual manner, is a tread component or band 20, and inserted between the carcass and the tread band is a belt structure 30 consisting of two radially superposed layers 31 and 32 of cords disposed at angles with respect to the midcircumferential plane of the tire in opposite directions, preferably symmetrically. The belt layers are formed in any appropriate known manner and in particular can comprise textile and/or metal reinforcing cords.

Tires so formed with the tire composition of this invention have an array of desirable characteristics. Stress/strain properties preferably show an increase in compound modulus over tire tread compositions having no silica coupled halogenated isobutylene rubber. Goodyear rebound of preferred embodiments show good resilience; at room temperature, rebound is lower or equal to compositions having no halogenated isobutylene rubber, and at elevated temperatures (e.g., 100° C.) rebound is superior. The rubber compositions have IRHD durometer values preferably ranging from 65 to 70 20' @ 160° C. Abrasion resistance is good; preferred compositions have PICO abrasion indices of about 115 to 120. The physical properties of example compositions are set out hereinafter.

Measures of dynamic response of preferred compositions predict good traction and improved rolling resistance. An industry accepted measure of tire traction is hysteresis loss, denoted by loss factor tan $\delta$, in the low temperature region ($-20°$ C. to 5° C.) as determined by any number of dynamic viscoelasticity tests. Traction improvement is obtained through the increase of the loss factor in the low temperature region. On the other hand, increased hysteresis loss at higher, operating temperatures of the tire, e.g., 50° to 80° C., results in high rolling resistance and poor fuel economy. To balance these counteracting considerations, the desirable tread compositions of this invention exhibit higher hysteresis loss at lower temperatures and lower hysteresis loss at higher temperatures. Example hysteresis loss measurements are plotted hereinafter.

Thus, employment of halogenated isobutylene rubber in tire tread rubber compositions with a silane-coupled silica filler provides a desirable tire tread composition having increased traction without a loss in abrasion resistance.

EXAMPLES

The following examples are presented to further illustrate and explain the present invention and should not be taken as limiting in any regard. Unless otherwise indicated, all parts and percentages are by weight, and are based on the weight at the particular stage of the processing being described.

EXAMPLE 1

Rubber compositions suitable for use in a tire tread are prepared by mixing the appropriate ingredients in a suitable and conventional rubber mixing apparatus or mill. The compositions are comprised of the recipes shown in the following Table I for rubber compositions identified herein as compositions A, B, C, and D.

As summarized in the Table, composition A is a control tire tread rubber comprising natural rubber and synthetic rubber. Compositions B, C, and D illustrate rubber compositions of this invention.

TABLE I

| Material | Composition, parts | | | |
|---|---|---|---|---|
| | A | B | C | D |
| Rubber Ingredients | | | | |
| Natural Rubber | 32 | 0 | 0 | 0 |
| Polybutadiene Rubber | 18 | 0 | 0 | 0 |
| Styrene-Butadiene Rubber | 50 | 40 | 40 | 40 |
| cis-Butadiene Rubber | 0 | 40 | 40 | 40 |
| Bromobutyl Rubber | 0 | 20 | 0 | 0 |
| Star-branched Bromobutyl | 0 | 0 | 20 | 0 |
| Isobutylene/Bromomethylstyrene | 0 | 0 | 0 | 20 |
| Fillers | | | | |
| Ground Rubber | 6 | 0 | 0 | 0 |
| Tread Grade Carbon Black | 62 | 55 | 55 | 55 |
| Silica | 0 | 20 | 20 | 20 |
| Silane | 0 | 5.6 | 5.6 | 5.6 |
| Other | | | | |
| Processing Oil | 20 | 35 | 35 | 35 |
| Zinc Oxide | 2.5 | 4 | 4 | 4 |
| Sulfur | 1.4 | 1.75 | 1.75 | 1.75 |
| Accelerators | 1.3 | 1.5 | 1.5 | 1.5 |
| Miscellaneous[1] | 4.5 | 5 | 5 | 5 |

[1]Antidegradants, fatty acids, waxes, tackifiers, and the like.

[1]Antidegradants, fatty acids, waxes, tackifiers, and the like.

EXAMPLE 2

This example illustrates one two-stage processing sequence and two three-stage processing sequences and for halogenated isobutylene-based rubber compositions B, C, and D set out in Example 1 above.

In a first sequence, the rubber ingredients, silica, silane, carbon black, and effective amounts of processing aids (including processing oil) are processed together in stage 1. In stage 2, zinc oxide, accelerators, antidegradants and the remaining ingredients are added, and the mixture processed to obtain the desired compositions.

In a second sequence, the rubber ingredients, silica, silane, part of the oil and part of the carbon black are processed together using conventional means in stage 1. In stage 2, the remaining carbon black and oil, and, optionally, part of the miscellaneous ingredients such as antidegradants are added. In the final stage 3, zinc oxide, sulfur, accelerators and any remaining ingredients are added, and the mixture processed to obtain the desired compositions.

In a third sequence, the rubber ingredients and fillers are processed with processing oil and an effective amount of processing aids in stage 1. In stage 2, antidegradants are added. In the final stage 3, zinc oxide, sulfur, accelerators and antidegradants are added, and the mixture processed to obtain the desired compositions.

EXAMPLE 3

In this example, the physical properties of the rubber compositions of Example 1 are compared and contrasted. The values are summarized in Table II below.

TABLE II

| Physical Property | Composition | | | |
|---|---|---|---|---|
| | A | B | C | D |
| Mooney Viscosity (ASTM D1646) | 57.3 | 57.7 | 56.5 | 65.2 |

TABLE II-continued

| Physical Property | Composition A | B | C | D |
|---|---|---|---|---|
| ML 4' @ 100° C. | | | | |
| Mooney Scorch @ 135° C. (ASTM D1646) | | | | |
| 2 pt. rise | 17.6 | 14.3 | 14.2 | 13.2 |
| 5 pt. rise | 19.3 | 16.1 | 15.9 | 14.6 |
| 10 pt. rise | 20.2 | 17.5 | 17.1 | 15.8 |
| Specific Gravity (ASTM D297) | 1.127 | 1.157 | 1.157 | 1.153 |
| IRHD Durometer (ASTM D1415) | 58.4 | 67.5 | 67.6 | 68.8 |
| 20' @ 160° C. Unaged Stress/Strain (ASTM D412)* | | | | |
| 300% Modulus, MPa | 6.6 | 12.2 | 11.4 | 13.4 |
| Tensile, MPa | 16.9 | 16.8 | 17.2 | 17.4 |
| Elong. @ Break | 580 | 400 | 440 | 380 |
| Rheometer (1d.100 cpm. 160° C., ASTM D2084) | | | | |
| $M_I$ | 11.5 | 11.6 | 11.6 | 13.0 |
| $M_L$ | 9.2 | 9.9 | 9.7 | 12.1 |
| $M_{H2}$ | 29.8 | 37.6 | 37.4 | 40.7 |
| $t_2$ | 5.6 | 4.7 | 4.6 | 4.3 |
| $t_{50}$ | 7.0 | 6.9 | 7.0 | 6.9 |
| $t_{90}$ | 9.3 | 12.0 | 12.2 | 12.9 |
| BFG Flexometer (ASTM D623)* | | | | |
| ΔT | 76 | 66 | 73 | 70 |
| % Set | 9.0 | 5.6 | 5.7 | 4.2 |
| % Static Comp. | 42.5 | 35.5 | 32.4 | 32.3 |
| % Init. Dynamic Comp. | 36.6 | 25.1 | 25.3 | 23.7 |
| % Final Dynamic Comp. | 39.9 | 27.5 | 29.0 | 26.1 |
| Goodyear-Healey Rebound (ASTM D1054)* | | | | |
| % Rebound @ RT | 44.6 | 44.6 | 45.5 | 42.4 |
| % Rebound @ 100° C. | 56.4 | 64.1 | 62.0 | 65.7 |
| Strip Adhesion (lbs.)* | | | | |
| To self: Orig, RT | 250 | 204 | 212 | 214 |
| ½ hr. @ 121° C., Hot | 250 | 157 | 180 | 155 |
| 24 hrs. @ 100° C., RT | 245 | 174 | 155 | 168 |
| PICO Abrasion (ASTM D2228)* Index | 117 | 120 | 114 | 120 |

*All test samples cured 20' @ 160° C.
*All test samples cured 20' @ 160° C.

EXAMPLE 4

Figure 2:
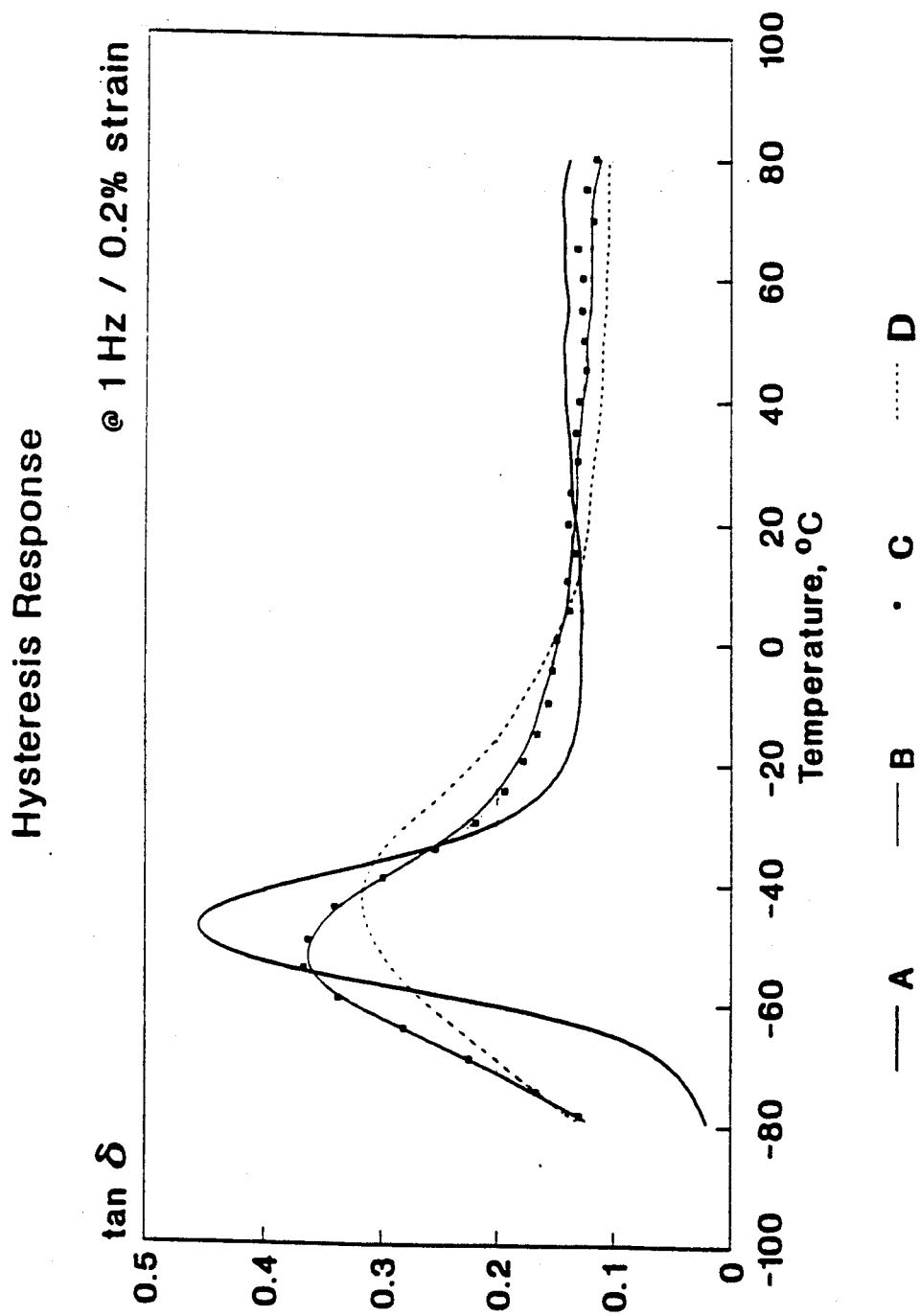
FIGS. 2 to 4 are viscoelastic curves for three tire tread halogenated isobutylene-based rubber compositions of this invention.

This example illustrates the hysteresis response for compositions A, B, C, and D of Example 1 compared by testing samples over a broad temperature spectrum ranging from −80° C. to 80° C. at 1 Hz and 0.1% strain using a Rheometric-Dynamic Analyzer RDAII. The viscoelastic curves are plotted in FIG. 2. The peak at the low temperature region indicates good traction, while at the same time a lower than typical loss factor in the upper temperature range indicates good rolling resistance.

Figure 3:
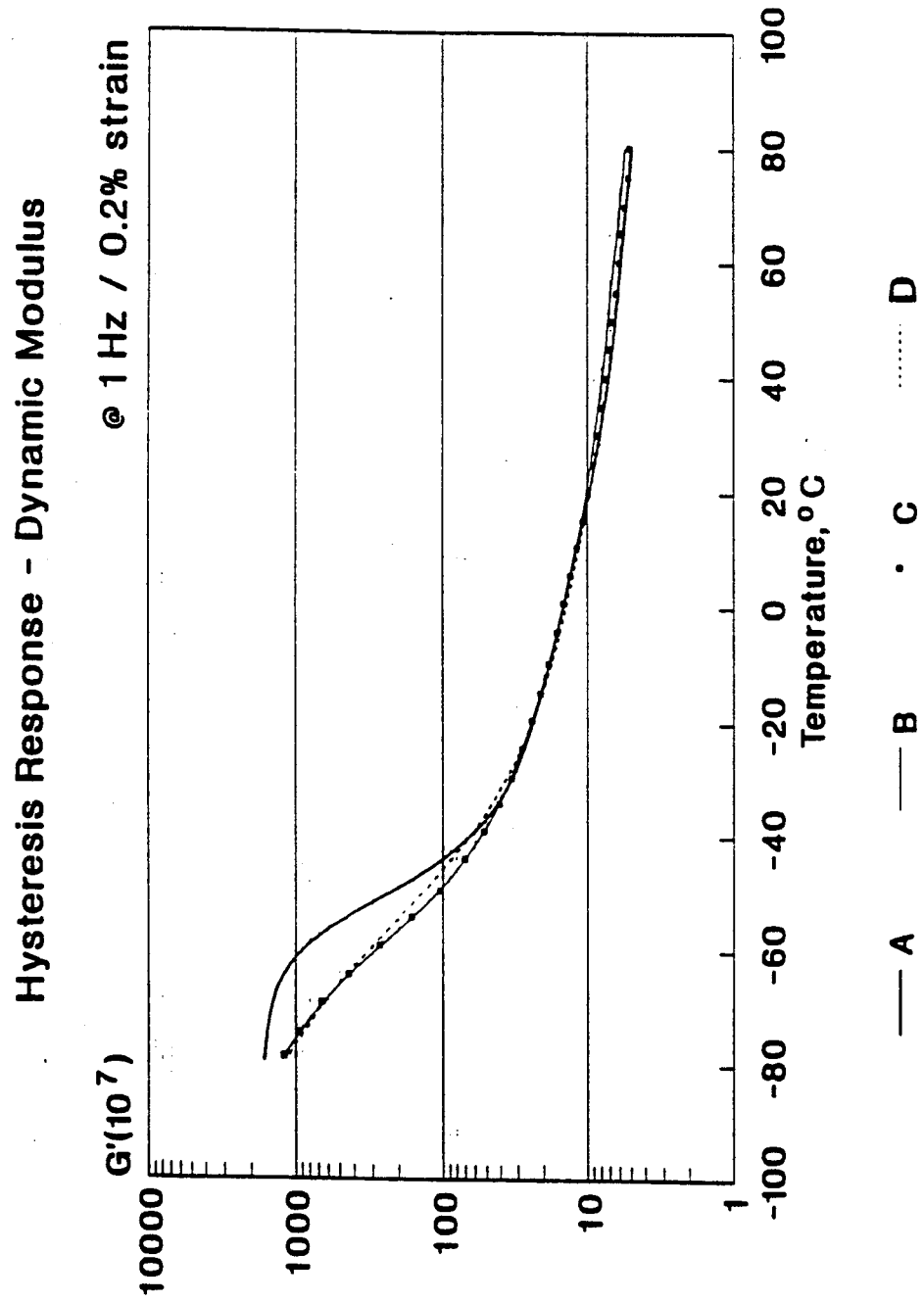
Figure 4:
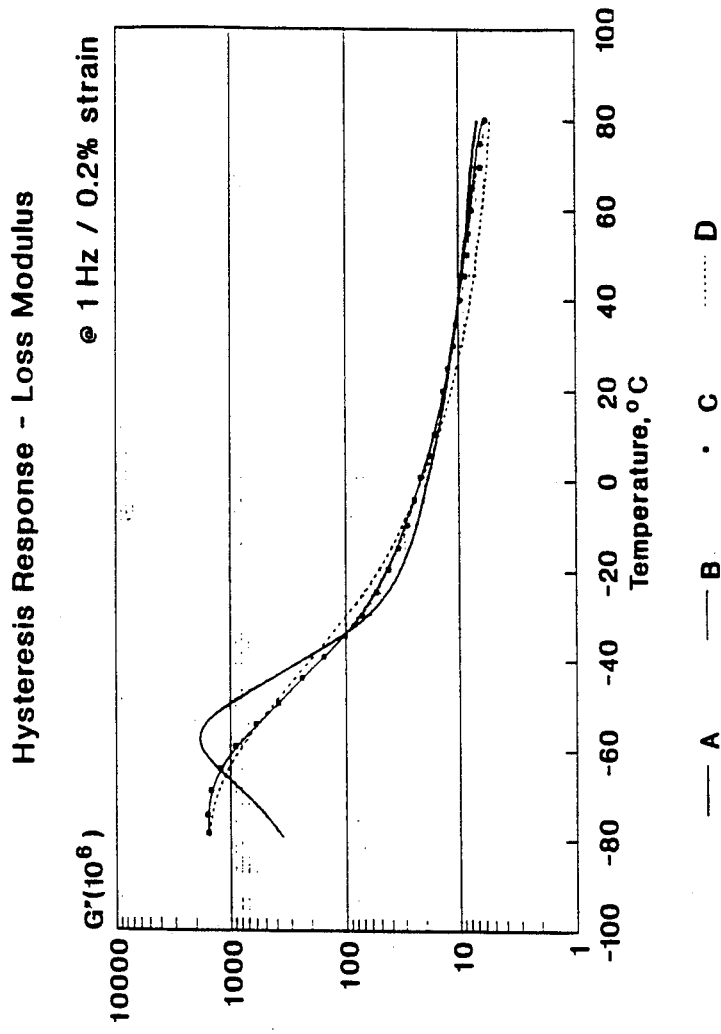

Dynamic modulus testing indicated that the experimental compounds have virtually the same dynamic response as the control over the temperature region of −40° C. to 80° C., illustrated in FIG. 3. At the same time, the loss modulus response produced a higher loss compliance for the experimental compounds than the control, particularly in the critical traction region between −20° C. and 5° C. (FIG. 4).

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A tire tread rubber composition which comprises 90 to 70 parts, per hundred parts rubber, a mixture of butadiene rubber and styrene-butadiene rubber, and 10 to 30 parts, per hundred parts rubber, halogenated isobutylene rubber, and further comprising 10 to 30 parts, per hundred parts rubber, silica and 1 to 8 parts, per hundred parts rubber, of an organosilane cross-linking agent.

2. A composition according to claim 1 comprising 20 to 60 parts, per hundred parts rubber, butadiene rubber and 20 to 60 parts, per hundred parts rubber, styrene-butadiene rubber.

3. A composition according to claim 1 wherein said halogenated isobutylene rubber is selected from the group consisting of bromobutyl, star-branched bromobutyl, and isobutylene/bromomethylstyrene.

4. A composition according to claim 1 wherein said halogenated isobutylene rubber is a terpolymer.

5. An abrasion-resistance tire tread rubber composition which comprises:
   (a) a rubber component comprising 10 to 30 parts, per hundred parts rubber, halogenated isobutylene rubber and 90 to 70 parts, per hundred parts rubber, a mixture of styrene-butadiene rubber and butadiene rubber;
   (b) 10 to 30 parts, per hundred parts rubber, silica filler; and
   (c) 1 to 8 parts, per hundred parts rubber, of an organosilane cross-linking agent and exhibiting higher hysteresis loss at lower temperatures and lower hysteresis loss at higher temperatures than a control composition formulated without the halogenated isobutylene rubber.

6. A composition according to claim 5 wherein the rubber component comprises 20 to 60 weight percent styrene-butadiene rubber and 20 to 60 weight percent butadiene rubber.

7. A composition according to claim 6 wherein said styrene-butadiene rubber has a bound styrene content of 10 to 50%.

8. A composition according to claim 6 wherein said butadiene rubber has 90% or greater cis content.

9. A composition according to claim 6 wherein said silica level is about 20 parts per hundred rubber.

10. A composition according to claim 6 wherein said halogenated rubber is a brominated rubber comprising about 20 weight percent of the rubber.

11. A composition according to claim 10 wherein said brominated rubber is selected from the group consisting of bromobutyl, star-branched bromobutyl and an isobutylene-bromomethylstyrene copolymer.

12. A composition according to claim 6 wherein said styrene-butadiene rubber comprises about 40 weight percent of the rubber and said butadiene rubber comprises about 40 weight percent of the rubber.

13. A composition according to claim 5 wherein said halogenated isobutylene rubber is a terpolymer.

14. A tire having a tread comprising the composition of claim 5.

15. A method for producing a tire tread composition which comprises:
   (a) blending 10 to 30 weight percent halogenated isobutylene rubber with 90 to 70 weight percent of a mixture of styrene-butadiene rubber and butadiene rubber, 10 to 30 parts, per hundred parts rubber, silica and 1 to 8 parts, per hundred parts rubber, of an organosilane cross-linking agent and effective amounts of processing aids to form a mixture;

(b) adding antioxidants, antiozonants, and effective amounts of processing aids; and (c) blending into said mixture an effective amount of cross-linking materials, cure accelerators, and cure activators.

16. A method according to claim 15 wherein the blend in the first step comprises equal weight percent concentrations of styrene-butadiene rubber and butadiene rubber, and 10 to 30 weight percent of a halogenated rubber.

17. A method according to claim 15 wherein tread grade carbon black is added in the first step.

18. A method according to claim 15 wherein said halogenated isobutylene rubber is a brominated rubber selected from the group consisting of bromobutyl, star-branched bromobutyl and isobutylene/bromomethylstyrene.

19. A tire having a tire tread employing the tire tread composition produced according to the method of claim 15.

20. A tire having a tire tread comprising a rubber composition which comprises 10 to 30 parts, per hundred parts rubber, isobutylene/para-bromomethylstyrene rubber and 90 to 70 parts, per hundred parts rubber, a mixture of styrene-butadiene rubber and butadiene rubber; 10 to 30 parts, per hundred rubber, silica; and 1 to 8 parts, per hundred parts rubber, an organosilane cross-linking agent.

21. A tire according to claim 20 wherein the tire tread rubber composition further comprises 20 to 60 parts, per hundred parts rubber, styrene/butadiene rubber and 20 to 60 parts, per hundred parts rubber, butadiene rubber.

22. A composition according to claim 3 wherein the isobutylene/bromomethylstyrene is isobutylene/para-bromomethylstyrene.

23. A composition according to claim 5 wherein the halogenated isobutylene rubber is isobutylene/para-bromomethylstyrene.

* * * * *

REEXAMINATION CERTIFICATE (3305th)
United States Patent [19]
Mroczkowski

[11] B1 5,162,409
[45] Certificate Issued Aug. 26, 1997

[54] TIRE TREAD RUBBER COMPOSITION

[75] Inventor: Tomasz S. Mroczkowski, Madison, Conn.

[73] Assignee: Pirelli Armstrong Tire Corporation, New Haven, Conn.

Reexamination Request:
No. 90/004,467, Nov. 25, 1996

Reexamination Certificate for:
Patent No.: 5,162,409
Issued: Nov. 10, 1992
Appl. No.: 739,701
Filed: Aug. 2, 1991

[51] Int. Cl.$^6$ .................................................. C08K 5/54
[52] U.S. Cl. .................. 524/262; 152/564; 523/235; 524/492; 524/493; 524/495; 524/496
[58] Field of Search ............................ 524/262; 152/564

[56] References Cited

U.S. PATENT DOCUMENTS

| | | | |
|---|---|---|---|
| 2,891,595 | 6/1959 | Kuntz et al. | 152/330 |
| 3,873,489 | 3/1975 | Thurn et al. | 524/493 |
| 4,229,333 | 10/1980 | Wolff et al. | 524/493 |
| 4,468,496 | 8/1984 | Takeuchi et al. | 525/233 |
| 4,519,430 | 5/1985 | Ahmad et al. | 152/209 R |
| 4,522,970 | 6/1985 | Scriver et al. | 524/447 |
| 4,640,952 | 2/1987 | Takiguchi et al. | 524/296 |
| 5,063,268 | 11/1991 | Young | 524/286 |

OTHER PUBLICATIONS

Wagner, M.P., "Fine–Particle Silicas in Tire Treads, Carcass, and Steel–Belt Skim", *Rubber Chemistry and Technology*, vol. 50, No. 2 (1997), pp. 356–363.

Keller, "Improvement of Tire Traction with Chlorobutyl Rubber", *Tire Science and Technology*, vol. 1, No. 2 (1973), pp. 190–201.

*European Rubber Journal*, p. 40 (Mar. 1974).

Conant, F.S., "Physical Testing of Vulcanizates (Abrasion Tests)," *Rubber Technology*, Third Edition, Van Nostrand Reinhold Company (1987), pp. 172–173.

Wagner, M.P., "Reinforcing Silicas and Silicates", *Rubber Chemistry and Technology*, vol. 49 (1976), p. 761.

American Society of Testing Methods Test [D 2228–88]—Standard Test Method for Rubber Property—Abrasion Resistance (Pico Abrader), pp. 1–7.

*Primary Examiner*—Veronica P. Hoke

[57] ABSTRACT

An abrasion-resistant halogenated isobutylene-based rubber composition having good traction characteristics is disclosed. In a preferred embodiment, the composition comprises a halogenated isobutylene rubber, styrene/butadiene rubber and polybutadiene rubber combined with carbon black and a silane-coupled silica filler. In automobile tire treads, tire retreads, and other anti-skid materials, the composition exhibits viscoelastic properties offering excellent traction and good rolling resistance with no loss in tire treadwear.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

* * * * *